(12) United States Patent
Shtern et al.

(10) Patent No.: US 8,416,814 B2
(45) Date of Patent: Apr. 9, 2013

(54) SYSTEM AND METHOD FOR HIGH PRECISION CLOCK RECOVERY OVER PACKET NETWORKS

(75) Inventors: Alon Shtern, Klryat Haim (IL); Alex Tal, Hadera (IL); Guy Kronenthal, Kiryat Ono (IL); Raz Korn, Hod-Hasharon (IL); Ziv Barak, Rishon-Letzion (IL); Osnat Shasha, Holon (IL)

(73) Assignee: Axerra Networks, Ltd., Tel Aviv (IL)

( * ) Notice: Subject to any disclaimer, the term of this patent is extended or adjusted under 35 U.S.C. 154(b) by 480 days.

(21) Appl. No.: 12/705,660

(22) Filed: Feb. 15, 2010

(65) Prior Publication Data

US 2011/0044357 A1  Feb. 24, 2011

Related U.S. Application Data

(63) Continuation-in-part of application No. 11/167,557, filed on Jun. 28, 2005, now Pat. No. 7,664,118.

(51) Int. Cl.
*H04J 3/06* (2006.01)

(52) U.S. Cl.
USPC ........... 370/516; 370/517; 375/346; 375/354; 375/371

(58) Field of Classification Search .................. None
See application file for complete search history.

(56) References Cited

U.S. PATENT DOCUMENTS

| | | | |
|---|---|---|---|
| 4,797,679 A * | 1/1989 | Cusdin et al. .................. 342/387 |
| 5,163,067 A * | 11/1992 | Wight et al. .................. 375/333 |
| 6,363,073 B2 | 3/2002 | Nichols | |
| 6,400,683 B1 | 6/2002 | Jay et al. | |
| 6,643,612 B1 * | 11/2003 | Lahat et al. .................. 702/186 |
| 6,721,328 B1 | 4/2004 | Nichols et al. | |
| 7,106,758 B2 * | 9/2006 | Belk et al. .................. 370/503 |
| 7,664,118 B2 | 2/2010 | Sasson et al. | |
| 2006/0005054 A1 * | 1/2006 | Fernald et al. ................ 713/300 |

* cited by examiner

*Primary Examiner* — Andrew Chriss
*Assistant Examiner* — Salvador E Rivas
(74) *Attorney, Agent, or Firm* — Law Offices of Edward Langer

(57) ABSTRACT

An improved system and method for achieving high precision clock recovery, i.e. reconstruction of the clock signal having the same frequency, over a packet switched network. The proposed method utilizes a minimum network delay approach, which overcomes the problems caused by delay variation of the network and filters out network jitter, such as noise jitter and other "singular" anomalies causing latency deviations. Minimum network delay is defined herein as the time delay in which a packet remains in the network under assumption that all transmission queues through which the packet passes are empty. The proposed system and method perform clock recovery by including an improvement in the form of dynamically varying thresholds. Reconstruction of the clock signal is performed in accordance with the minimum network delay estimation based on an adjustable threshold, i.e., the latency change threshold, which increases when the noise threshold increases and decreases when the noise threshold decreases. This allows detection of latency changes in accordance with the dynamically varying network conditions and avoids false latency change detections.

26 Claims, 6 Drawing Sheets

SYSTEM AND METHOD FOR HIGH PRECISION CLOCK RECOVERY OVER PACKET NETWORKS

CROSS-REFERENCE TO RELATED APPLICATIONS

The present application is a continuation-in-part of U.S. patent application Ser. No. 11/167,557 entitled "System and Method for High Precision Clock Recovery over Packet Networks, filed Jun. 28, 2005, now U.S. Pat. No. 7,664,118 the contents of which are incorporated herein by reference.

FIELD OF THE INVENTION

The present invention relates generally to a system and method for high precision clock recovery, i.e reconstruction of the clock signal having the same frequency, over a packet switched network.

BACKGROUND OF THE INVENTION

Clock recovery is defined to be the reconstruction of timing information from digital data over packet switched networks. A packet switched network comprises various interfaces and layer protocols, whereas clock synchronization is usually maintained between physical connected interfaces and not maintained end-to-end. Hence, an accurate clock mechanism must be provided for services that require end-to-end clock synchronization (e.g. CES, Voice, Video, etc.) as well as for an end-to-end transmission of accurate timing information (e.g. cellular 3G applications).

The clock recovery mechanism over packet switched networks involves two basic procedures—generation of packets at the local site and reconstruction of the clock signal at the remote side. The first procedure generates packets carrying relevant information of the source clock (at the local side). These packets are transmitted to the remote side over the packet switched network. At the second procedure, reconstruction of the clock signal is obtained from the received information at the remote side.

A major problem in trying to synchronize a clock over an asynchronous network while achieving a high precision clock accuracy is to compensate for delay variation (e.g. filter out network jitter affecting arriving packets, latency changes, etc.). The delay in the network is a superposition of passive and active network factors. Passive network factors, such as fiber and cable, are usually constant physical factors, wherein their variation is very small and therefore can be neglected. However, active network factors, such as switches and routers, produce delay with significant variation that must be filtered out.

The traditional approach to filter out network jitter calculates the average delay using statistical estimation. However, the main drawback of this approach is that the statistical estimation depends on active network utilization factors, consequentially presenting unstable average delay calculations.

U.S. Pat. No. 6,363,073 discloses a circuit and method for synchronizing a service clock at a destination node with a service clock at a source node for circuit emulation service over a packet network. The method includes receiving data packets from a source node of the destination node. At the destination node, the method removes from the data packets residual time-stamp (RTS) values that were created at the source node based on information received from the service clock at the source node. RTS values are stored in memory at the destination node. The method determines a majority count and a minority count of RTS values over a period of time from the RTS values stored in memory. The method further uses the majority and minority counts to set the frequency of a service clock at the destination node for use in receiving data packets.

Yet another method for overcoming delay variation provides an adaptive clock, in which the receiver buffers incoming traffic and compares the level of the buffer with a local clock. The level of the buffer is used to control the frequency of the clock, so that the clock controlling the destination node buffer must operate at a frequency precisely matched to that of the service signal input at the source node in order to avoid buffer overflow or underflow and resulting loss of data. However, this method suffers from significant limitations revealing inaccurate results, and is therefore less efficient.

The prior art using such a method for clock recovery in a packet network include U.S. Pat. No. 6,721,328 to Nichols et al. and U.S. Pat. No. 6,400,683 to Jay. This method is further disclosed in U.S. Pat. No. 6,363,073 to Nichols.

The above-mentioned approaches for clock recovery all suffer from drawbacks which in one way or the other affect the final results.

Our previous invention (US Patent Application 2006/0291479) overcomes the disadvantages of prior art techniques by disclosing an improved and efficient system and method for reconstruction of the clock having the same frequency, over a packet switched network.

Such a system and method are provided for achieving high precision clock recovery by utilizing a minimum network delay approach, which overcomes the problems caused by delay variation of the network and filters out network jitter.

However, in our previous invention the system uses a static threshold, i.e., the latency change mechanism checks if the latency changed by more than a static defined threshold, and if the latency has changed, the algorithm corrects all the minimum samples by the size of the latency change.

Such a system, however, cannot adapt itself for different network conditions with different packet delay variations.

SUMMARY OF THE INVENTION

Accordingly, it is a principal object of the present invention to overcome the disadvantages of prior art techniques used for clock recovery over a packet switched network.

The present invention discloses an improved and efficient system and method for high precision clock recovery, i.e. reconstruction of the clock having the same frequency, over a packet switched network.

The present invention is advantageous for overcoming a crucial problem in clock recovery by including an improvement in the form of dynamically varying thresholds.

The proposed method, according to the preferred embodiment, is provided for achieving high precision clock recovery by utilizing a minimum network delay approach, which overcomes the problems caused by delay variation of the network and filters out network jitter.

In accordance with a preferred embodiment of the present invention, there is provided a system and a method for high precision clock recovery over a packet switched network.

A preferred method of the invention comprises the steps of generating packets at a local unit carrying information to a remote unit using a local clock signal, wherein each generated packet carries transmission time information generating a remote timestamp at the remote unit for each generated packet;

providing a minimum network delay estimation for filtering out network jitter, wherein the minimum network delay estimation is defined as a time delay in which a packet remains in the packet switched network, assuming that all transmission queues through which the packet passes through are empty, wherein the time delay varies in accordance with network latency, providing a threshold associated with a change in the network latency, the threshold being adjustable in accordance with network conditions; and reconstructing a received clock signal having the same frequency as the local clock signal based on a time difference between the transmission time information and the remote timestamp, wherein the reconstructing step is performed in accordance with said minimum network delay estimation based on the adjustable threshold.

In accordance with another method of the present invention, the method further comprises the step of building at least one high frequency reference clock.

In the preferred method of the invention, the packets are transmitted with transmission time information comprising a transmitted timestamp.

In an alternative method of the invention, the packets are generated at a constant packet rate, and transmission time information comprises a transmitted timestamp associated with the constant packet rate, wherein the transmitted timestamp is determined at the remote unit.

In accordance with another method of the present invention, the method further comprises the step of providing latency estimation for detecting minimum delay values, wherein each of the minimum delay values is the time difference between the transmitted timestamp and the remote timestamp over a time window.

In accordance with another method of the present invention, the method further comprises the step of converting each of the minimum delay values into a control word for obtaining an accurate received clock signal.

In accordance with another method of the present invention, the method further comprises the step of estimating a noise threshold for determining whether each of the detected minimum delay values is noise or not.

In accordance with another method of the present invention, the noise threshold estimation comprises the steps of:

(1) obtaining a minimum delay value over a time window, and (2) checking if the obtained minimum delay value is noisy. If it is noisy, the noise threshold is increased. However, if it is not noisy, the noise threshold is decreased.

In accordance with some embodiments of the present invention, increasing the noise threshold is carried out by multiplying the noise threshold by a 'Noise Compensation Factor', and decreasing the noise threshold is carried out by dividing the noise threshold by a 'Smooth Compensation Factor'.

In accordance with some embodiments of the present invention, the latency change threshold directly depends on the noise threshold. Namely, the latency change threshold increases when the noise threshold increases, and similarly, the latency change threshold decreases when the noise threshold decreases.

In accordance with another method of the present invention, the network jitter includes noise jitter and other "singular" anomalies causing latency deviations.

In accordance with a preferred embodiment of the present invention, there is provided a system for high precision clock recovery over a packet switched network, the system comprising:

means for generating packets at a local unit carrying information to a remote unit using a local clock signal, wherein each generated packet carries transmission time information;

means for generating a remote timestamp at the remote unit for each generated packet, means for obtaining minimum network delay estimation for filtering out network jitter, wherein the minimum network delay estimation is defined as a time delay in which a packet remains in the packet switched network, assuming that all transmission queues through which the packet passes are empty wherein the time delay varies in accordance with network latency, means for providing a threshold associated with a change in the network latency, the threshold being adjustable in accordance with network conditions; and means for reconstructing a received clock signal having the same frequency as the local clock signal based on a time difference between the transmission time information and the remote timestamp, wherein the reconstruction is performed in accordance with the minimum network delay estimation based on the adjustable threshold.

Additional features and advantages of the invention will become apparent from the following drawings and description.

BRIEF DESCRIPTION OF THE DRAWINGS

For a better understanding of the invention with regard to the embodiments thereof, reference is made to the accompanying drawing, in which like numerals designate corresponding sections or elements throughout, and in which.

DETAILED DESCRIPTION OF A PREFERRED EMBODIMENT

As previously stated in US Patent Application 2006/0291479, a major contributor to the delay variation of the active network elements derives from the equipments' transmission queue. The delay variation deriving from the transmit queues depends on the priority of the packet, the scheduling mechanism provided, the network and applicable queue utilization. Hence, network utilization, size of packets within the network as well as their priority are most important factors which affect the time a packet carrying clock information spends in the equipments' transmission queue.

One of the problems with clock recovery is to reconstruct the clock signal while there are network latency changes.

US Patent Application 2006/0291479 describes a latency change detection mechanism that checks if the latency changes by more than a static defined threshold. If the latency has changed, the algorithm corrects all the minimum samples by the size of the latency change However, since the above-mentioned mechanism is limited by use of a static threshold, it lacks the ability to adapt itself for different network conditions with different packet delay variations. For instance, in case that the network is very noisy, the "noise" threshold and the "latency change" threshold have to be accordingly higher. However, if the thresholds are not as high as required and are static, the following may occur:

A large number of minimum values may be classified as noise. This may cause very poor clock recovery results. In an extreme case, all of the minimum values may be classified as noise, and the clock recovery mechanism may not work at all and may stay in holdover.

False latency change detection might occur.

On the other hand, if the thresholds are higher than required and are static, the clock recovery mechanism may not consider small observable latency changes as latency changes.

To overcome the above-mentioned problem, the system and method of the present invention allows better reconstruction of the clock signal while there are network latency changes. More specifically, the system and method of the present invention allows dynamic variations of the following thresholds according to the network conditions:

Noise threshold which determines if a window's minimum value is considered as noise or not.

"Latency change" threshold which determines what size of latency change will be detected by the clock recovery mechanism.

Figure 1:
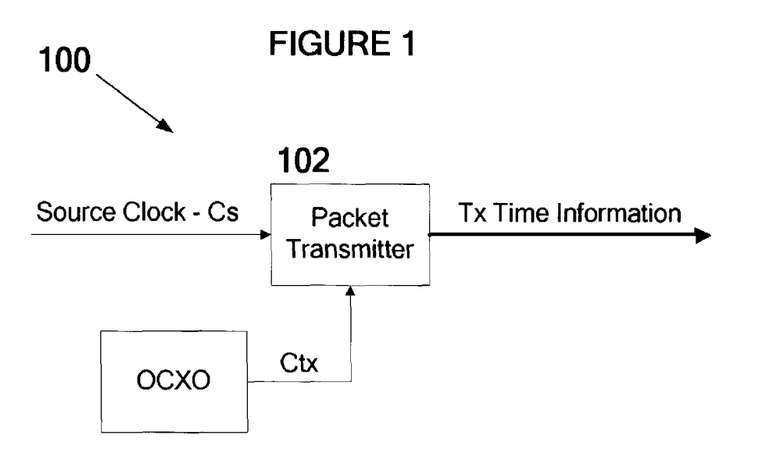
FIG. 1 shows a block diagram of a system for generating packets carrying clock information, constructed and operated in accordance with the principles of the preferred embodiment of the present invention.
Figure 2:
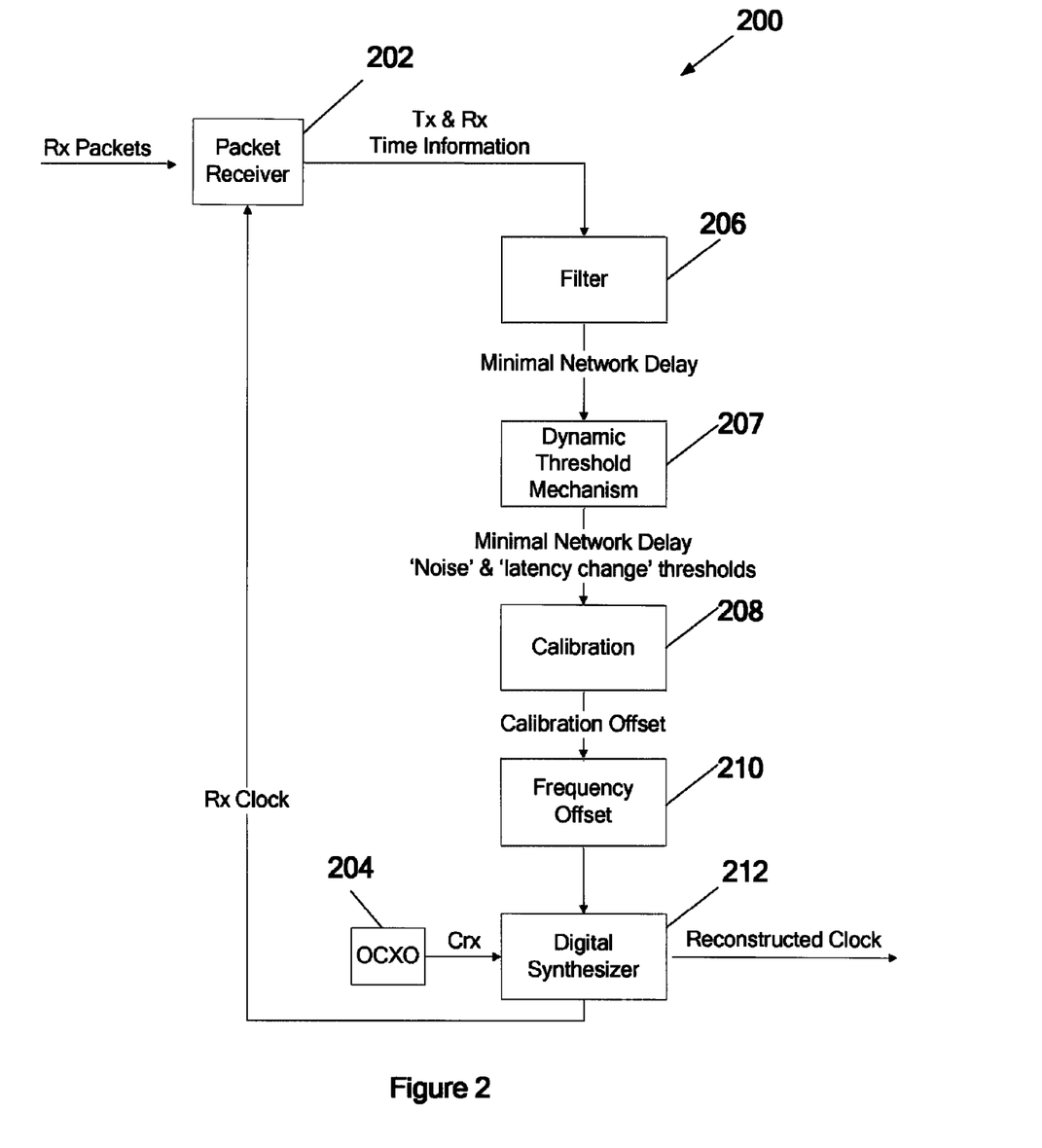
FIG. 2 shows a block diagram of a system for reconstructing a high precision clock from packets that are transmitted within a packet switched network, constructed and operated in accordance with the principles of the preferred embodiment of the present invention.

Thus, the clock recovery system over packet switched networks according to some embodiments of the present invention involves two basic procedures—generation of packets (see FIG. 1) and reconstruction of the clock signal (see FIG. 2).

Referring now to FIG. 1, there is shown a block diagram of a system 100 for generating packets carrying clock information, constructed and operated in accordance with the principles of the preferred embodiment of the present invention.

Generation of packets is provided for carrying clock information to a remote unit in relation to a source clock at the local side. A packet transmitter 102 generates packets at an interval of N msec (this is true for constant packet rate, however it can also be done using random intervals), where the actual interval is counted using ticks/pulses of the source clock Cs. Each generated packet carries transmission time information (Tx). Tx transmission time information is calculated using a high frequency reference clock Ctx at the exact moment the packet is generated.

In one embodiment, the transmission time information is provided as a transmitted timestamp which presents the exact time the packet was transmitted at the local side.

One of the ways to build such a reference clock is to use an Oven Controlled Crystal Oscillator (OCXO) unit 104.

In another embodiment, the packets are generated at a constant packet rate, such as in the case of circuit emulation services, and in this case, the transmission time information is generated in the local unit and the remote unit (the unit performing the clock recovery) determines a "rate-based" transmitted timestamp. This approach is based on two assumptions:

1 The service is constant packet rate. Therefore, once packet "n" is received at the remote unit, the remote unit "knows" when packet "n+1", "n+2", "n+m", . . . will arrive.

2. All packets contain a packet sequence number.

Thus, in a constant packet rate service, whether the packet carries a transmitted timestamp or not, the Tx time information is made available In case the original source clock Cs is taken from a very stable source clock, such as Stratum 1 (per ANSI standard T1.101), this source clock itself can be used to build the reference clock Ctx.

Referring now to FIG. 2, there is shown a block diagram of a system 200 for reconstructing a high precision clock from packets that are transmitted within a packet switched network, constructed and operated in accordance with the principles of the present invention.

In accordance with the preferred embodiment of the present invention, system 200 comprises an Oven Controlled Crystal Oscillator (OCXO) 204. OCXO 204 is provided for creating a reference clock Crx. After Crx is transmitted to Digital Synthesizer 212, a reconstructed clock Rx is obtained for generating remote timestamp Rx at the remote side.

A frequency difference between the two OCXO units 104 and 204 creates a time difference between Rx and Tx timestamps. Due to the stability of the two OCXO units 104 and 204, this time difference within the regression time window is small and almost constant when applying a clock recovery regression algorithm.

At the first phase, a packet receiver 202 at the remote side receives the network packets (Rx packets) carrying clock information, i.e. Tx transmission time information along with the locally generated remote timestamp Rx. As stated above, the Tx transmission time information is provided either as a transmitted timestamp or as a "rate-based" transmitted timestamp.

Tx and Rx timestamps are then transmitted forward to a filter 206. Filter 206 receives the timestamps and filters out network jitter resulting from a superposition of the various network elements. Minimum network delay estimation (see FIG. 3) is provided for filtering out this unwanted network jitter.

Figure 4:
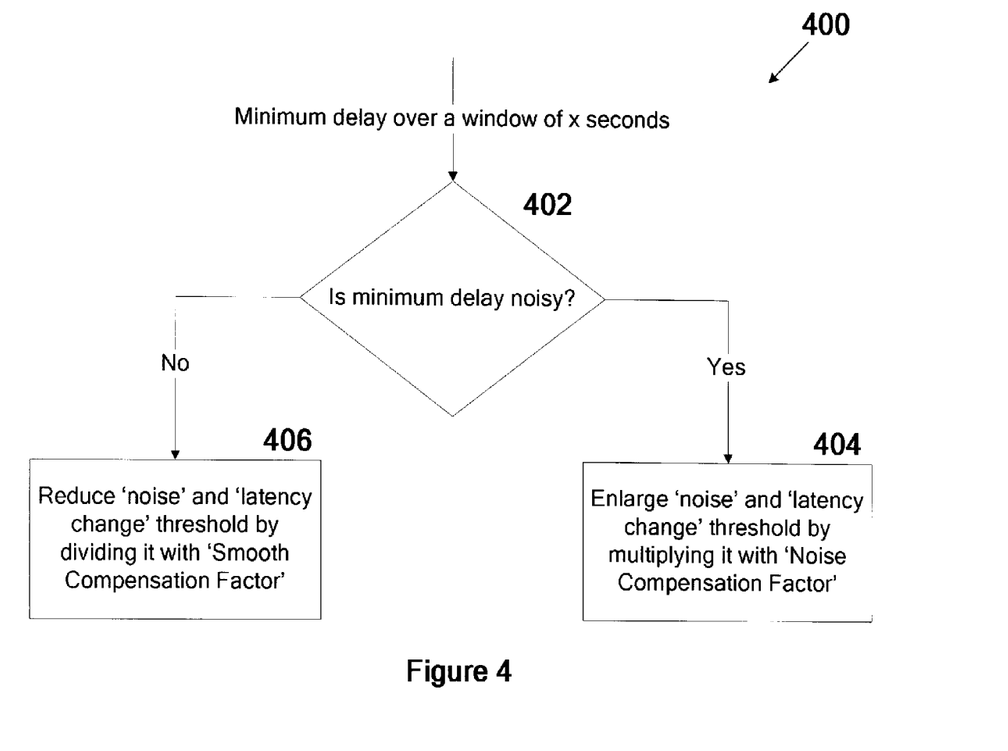
FIG. 4 is a flow chart of a 'noise' and 'latency change' threshold estimation procedure used in accordance with a preferred method of the present invention.

At the second phase, signals carrying filtered clock information are transmitted to a dynamic threshold mechanism unit 207 which estimates "noise" and "latency change" thresholds (see FIG. 4).

Then, the "noise" and "latency change" thresholds are transmitted to a calibration unit 208. Calibration unit 208 utilizes the "noise" and "latency change" thresholds (see FIG. 4) for filtering out "singular" anomalies in the network latency. This estimation is obtained by calculating the difference between the frequency of the transmitted timestamp Tx and remote timestamp Rx, thus detecting minimum delay values over each time window. The calibration procedure is a regression.

Signals from the calibration unit 208 are then transmitted to a frequency-offset unit 210. Frequency-offset unit 210 is provided for converting each of these minimum delay values (i.e. the calculated time differences between the reference clock Ctx at the local side and the reference clock Crx at the remote side) into a control word, as required by digital synthesizer 212. The control word is updated every 500 ms and a simple average algorithm is used to improve the frequency accuracy beyond the LSB (Low Significant Bit) value of the digital synthesizer 212.

At the last phase, signals from the frequency-offset unit 210 are transmitted to digital synthesizer 212. Digital synthesizer 212 utilizes the control word for generation of the accurate reference clock Crx at remote side.

Figure 3:
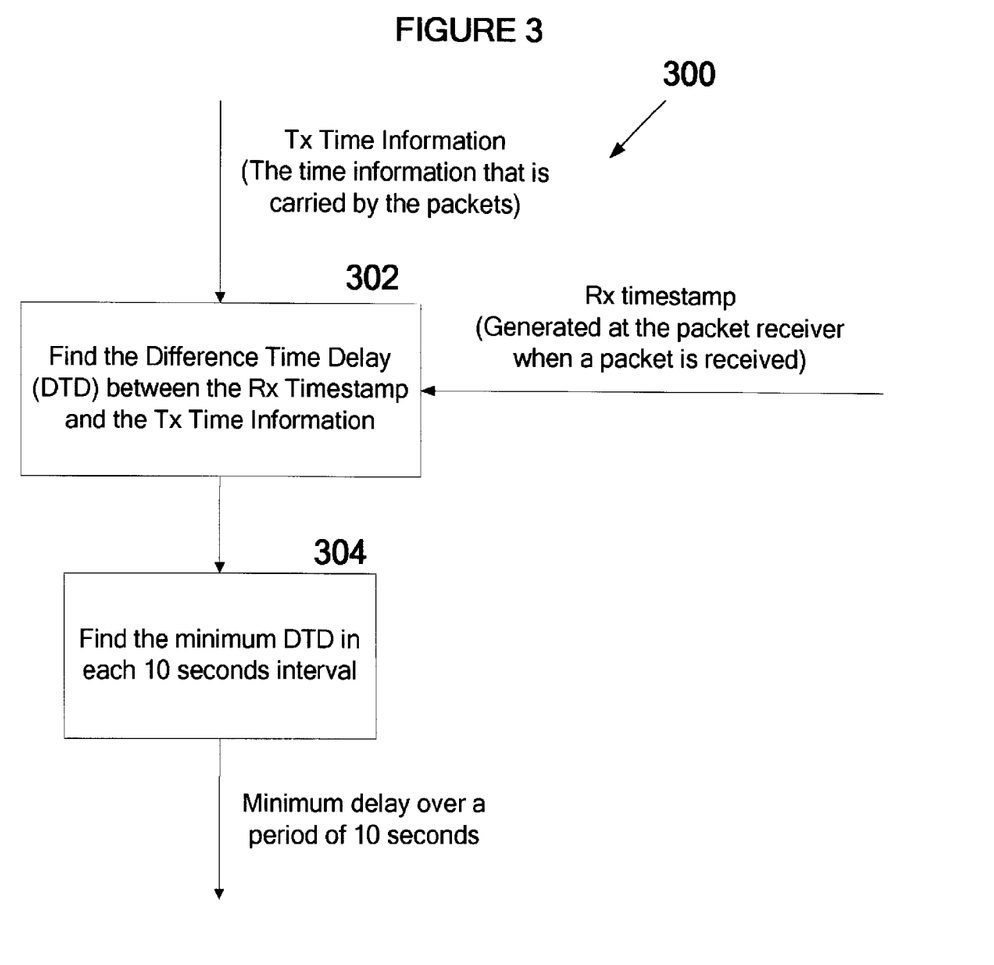
FIG. 3 is a flow chart of a minimum network delay estimation used in accordance with a preferred method of the present invention.

FIG. 3 is a flow chart of a minimum network delay estimation used in accordance with a preferred method of the present invention.

Minimum network delay is defined herein as the time delay in which a packet remains in the network, under assumption that all transmission queues through which the packet passes are empty. The proposed minimum network delay estimation determines a time delay based on constant physical factors while minimizing the dependency on network utilization restrictions. Consequently, more accurate and stable results are obtained. Furthermore, taking the minimum delay as a reference within a time window significantly reduces the negative effects created from the delay variation.

The minimum network delay estimation is provided for filtering out network jitter, such as noise jitter, essential for achieving a high precision clock recovery. Noise filtering is required for detecting large time deviations in the samplings. Such deviations may be a cause of a busy network, for example.

At the initial block 300, a remote unit receives arriving network packets carrying the packet's transmitted timestamp Tx and the remotely generated Rx timestamp. At block 302, a minimum delay value is provided. This value represents the time difference between Tx and Rx timestamps.

At block 304, in accordance with a preferred embodiment of the present invention, a minimum delay value is calculated at an interval of 10 seconds. The obtained minimum delay value is then used as input by the calibration unit 208 (see FIG. 2) as well as the latency change estimation (see FIG. 4).

Although the method as described above relates to minimum network delay estimation, the proposed method according to the present invention is provided for any other method using minimum delay estimations for filtering out network jitter and providing high precision clock recovery.

FIG. 4 is a flow chart of an estimation procedure for the "noise" and "latency change" thresholds used in accordance with a preferred method of the present invention.

The "noise" and "latency change" thresholds are provided by an estimation procedure used for filtering out other "singular" anomalies, which are required for handling latency deviations and restoring calibration values that have been unintentionally changed as a result. Latency deviations may result from singular network effects that change a network path between two elements in the network. Such network effects include, but are not limited to, protection switch, re-routing, link upgrades, etc.

Thus, according to some embodiments of the present invention, the following scheme is used for optimizing the "noise" threshold and the "latency change" threshold:
1. The "noise" threshold and the "latency change" threshold are increased when the minimum value is noisy.
2. The "noise" threshold and the "latency change" threshold are decreased when the minimum value is smooth.

In accordance with some embodiments of the present invention, the "noise" threshold should be close to the upper limit of the noise. More specifically, the "noise threshold" should be decreased till a predefined percentage of the minimum value measures are outside the threshold.

For this approach, two parameters should be pre-determined:
1. "Acceptable noise level"
2. "Noise compensation factor"

The "acceptable noise level", in accordance with some embodiments of the present invention, may have a percentile form and may define the percentage of the minimum delay samples that are outside the noise threshold.

The "noise compensation factor", in accordance with some embodiments of the present invention, is a multiplication function used to increase the noise threshold in case of a noisy minimum value.

Based on these two parameters, the division in case of a smooth minimum value can be calculated. This parameter is called the "smooth compensation factor".

Thus, the minimum delay value obtained in FIG. 3 is transmitted to block 400 which is a flow chart of an estimation procedure for obtaining the "noise" and "latency change" thresholds used in accordance with a preferred method of the present invention.

As seen in FIG. 4, Block 402 checks whether the obtained minimum delay value is noisy. If it is noisy, "noise" and "latency change" thresholds are enlarged in block 404. This is carried out by multiplying the "noise" threshold by a "Noise Compensation Factor". However, if the obtained minimum delay value is not noisy, the "noise" and "latency change" thresholds are reduced in block 406. This is carried out by dividing the "noise" threshold by a "Smooth Compensation Factor".

In the "noise threshold" estimation procedure, according to some embodiments of the present invention, each minimum value that is outside the noise threshold is defined as a noisy minimum value. Each minimum value that is inside the noise threshold is defined as a smooth minimum value.

Both the "noise threshold" and "latency change" threshold are increased upon noisy minimum value detection, and decreased upon smooth minimum value detection.

It should be noted that the latency change threshold varies with the change in the noise as it directly depends on the "noise threshold". In a noisy system, latency changes may not be detected; therefore, the "latency threshold" should be increased. Thus, in general, depending on the noise level of a system, the "latency change" threshold should be defined so that the smallest latency changes will be detected and false latency changes will not be detected.

Figure 5:
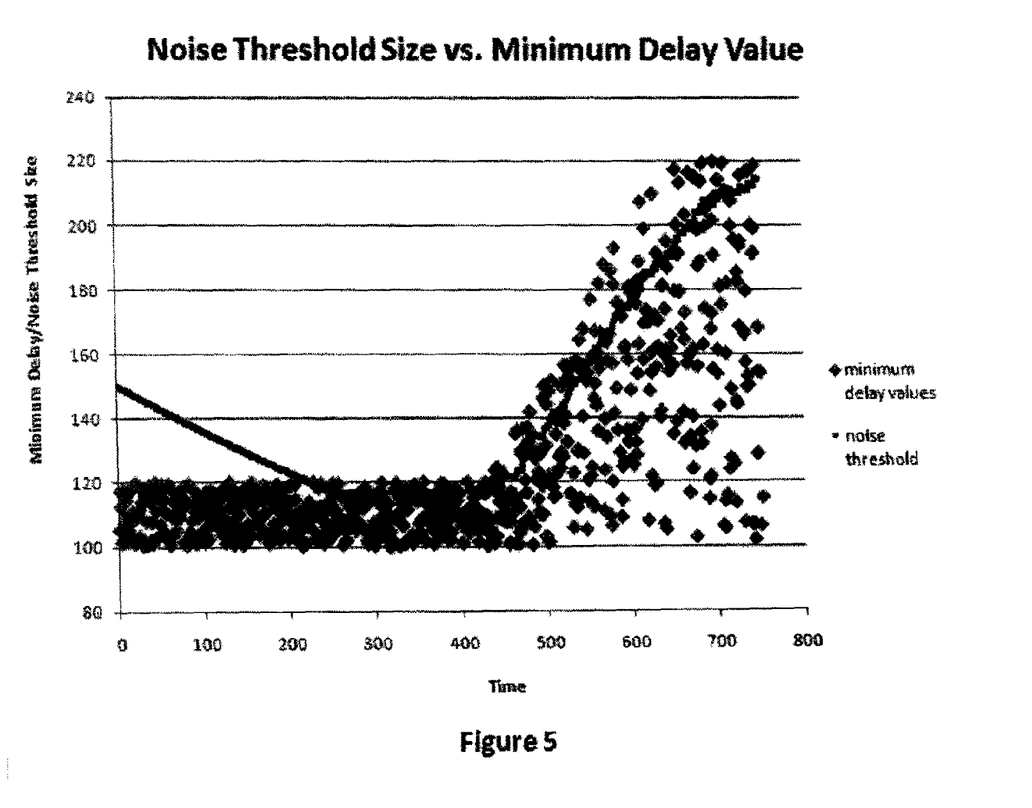
FIG. 5 is a plot of 'noise threshold' size versus minimum delay value in accordance with a preferred method of the present invention.

Noisy network conditions may end with large thresholds (see FIG. 5), while high network quality may end with small thresholds. As seen in the figure, a highly noisy network conditions lead to a quite high threshold. In such a case of a highly noisy network, identifying relatively small latencies may be difficult and even impossible.

Example I

A Method for Estimating the "Noise Compensation Factor"

1. Obtain a minimum delay value over a time window.
2. Check if the obtained minimum delay value is noisy.
3. In case it is noisy, multiply the noise threshold by a parameter, x ("Noise compensation factor"), where x is greater than 1.
4. In case it is not noisy, divide the noise threshold by y ("Smooth compensation factor").
5. Determine the value of y by using the following equation:

$$y^{100-m} = x^m \Rightarrow y = x^{\frac{m}{100-m}}$$

where m is a desired ratio of noisy vs. not noisy (smooth) minimum delay values.

Figure 6:
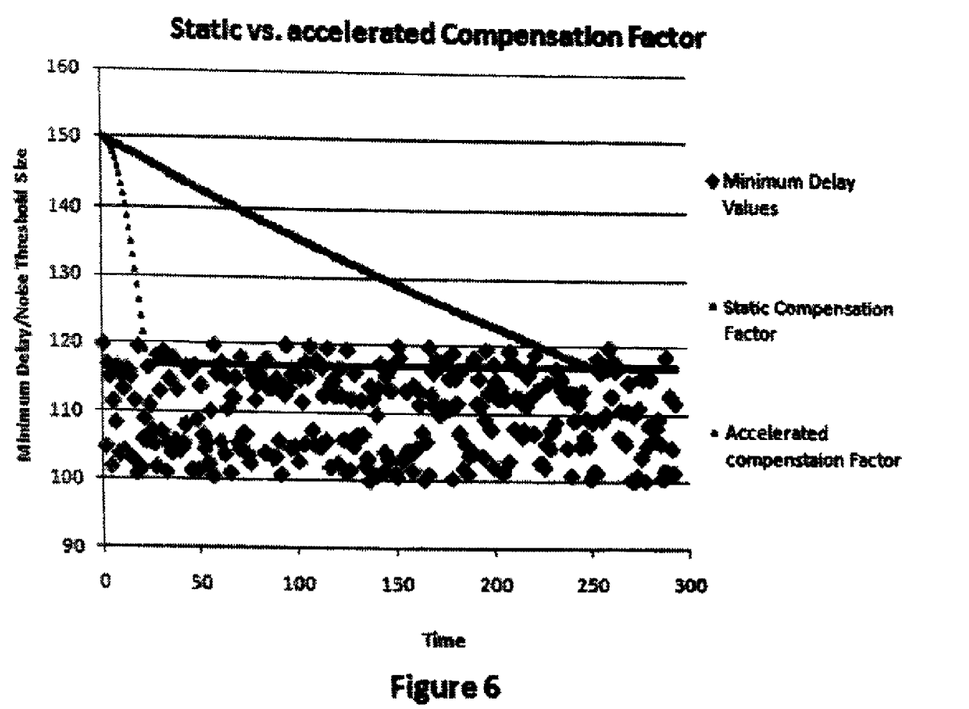
FIG. 6 is a plot of static versus accelerated compensation factor in accordance with a preferred method of the present invention.

It should be noted that fast responses are highly desired when adjusting the thresholds. Therefore, an accelerated threshold adjustment procedure (see FIG. 6) is provided in accordance with some embodiments of the present invention for adjusting the "noise" threshold. More specifically, the "Noise Compensation Factor" is accelerated/decelerated upon a very noisy network for adjusting the thresholds faster. As seen in the figure, a quicker adjustment of the desired threshold is achieved with the use of an accelerated compensation factor.

Similarly, the "Smooth Compensation Factor" is accelerated/decelerated upon very smooth network, in order to adjust the thresholds faster.

An example illustrating the "Noise Compensation Factor" acceleration is provided as follows:

Example II

Acceleration of the "Noise Compensation Factor"

If n % (n>>m) or more of the minimum delay values in a timeframe are noisy, increase the "Noise Compensation Factor".

If less than n % of the minimum delay values in a timeframe are noisy, reset the "Noise Compensation Factor" to its original value.

An example illustrating the "Smooth Compensation Factor" acceleration is provided as follows:

Example III

"Smooth Compensation Factor" Acceleration

If k % or more (100≧k>>100−m) of the minimum delay values in a timeframe are smooth, increase the 'Smooth Compensation Factor'.

If less than k % of the minimum delay values in a timeframe are smooth, reset the "Smooth Compensation Factor" to its original value.

Although the method as described above relates to an estimation procedure for obtaining the "noise" and "latency change" thresholds, the proposed method according to the present invention is provided for any other method of filtering out "singular" anomalies and handling latency deviations, thus obtaining high precision clock recovery.

It can be understood that other implementations are possible within the scope of the invention, thus relating to any system and method providing high precision clock recovery.

Having described the invention with regard to certain specific embodiments thereof, it is to be understood that the description is not meant as a limitation, since further modifications will now suggest themselves to those skilled in the art, and it is intended to cover such modifications as fall within the scope of the appended claims.

We claim:

1. A method for high precision clock recovery over a packet switched network, said method comprising the steps of:
    generating packets at a local unit carrying information to a remote unit using a local clock signal, wherein each generated packet carries transmission time information;
    generating a remote timestamp at said remote unit for each said generated packet;
    providing a minimum network delay estimation for filtering out network jitter, wherein said minimum network delay estimation is defined as a time delay in which a packet remains in the packet switched network, assuming that all transmission queues through which said packet passes are empty, wherein said time delay varies in accordance with network latency,
    providing a threshold associated with a change in said network latency, said threshold being adjustable in accordance with network conditions; and
    reconstructing a received clock signal having the same frequency as the local clock signal based on a time difference between said transmission time information and said remote timestamp,
    wherein said reconstructing step is performed in accordance with said minimum network delay estimation based on said adjustable threshold,
    the method further comprising the step of:
    estimating a noise threshold for determining whether each of the detected minimum delay values is noise or not, wherein said noise threshold estimation comprises the steps of:
        obtaining a minimum delay value over a time window;
        checking if said obtained minimum delay value is noisy, and if so, increasing said noise threshold, while if not noisy, decreasing said noise threshold;
        wherein increasing said noise threshold is carried out by multiplying said noise threshold by a "Noise Compensation Factor"; and
        decreasing said noise threshold is carried out by dividing said noise threshold by a "Smooth Compensation Factor".

2. The method of claim 1 further comprising the step of building at least one high frequency reference clock.

3. The method of claim 1 wherein said transmission time information comprises a transmitted timestamp.

4. The method of claim 1 wherein said packets are generated at a constant packet rate, and said transmission time information comprises a transmitted timestamp associated with said constant packet rate, wherein said transmitted timestamp is determined at said remote unit.

5. The method of claim 1 further comprising the step of estimating a latency change threshold for detecting minimum delay values, wherein each of said minimum delay values is said time difference between said transmission time information and said remote timestamp over a time window.

6. The method of claim 5 further comprising the step of converting each of said minimum delay values into a control word for obtaining an accurate received clock signal.

7. The method of claim 5, wherein said latency change threshold directly depends on said noise threshold, and said latency change threshold increases when the noise threshold increases, while said latency change threshold decreases when the noise threshold decreases.

8. The method of claim 1, wherein said "Noise Compensation Factor" is increased if n % or more of the minimum delay values in a timeframe are noisy.

9. The method claim 1, wherein said "Noise Compensation Factor" is reset if less than n % of the minimum delay values in a timeframe are noisy.

10. The method of claim 1, wherein said "Smooth Compensation Factor" is increased if k % or more of the minimum delay values in a timeframe are smooth.

11. The method of claim 1, wherein said "Smooth Compensation Factor" is reset to its original value if less than k % of the minimum delay values in a timeframe are smooth.

12. The method of claim 1 wherein said step of providing said minimum network delay estimation includes noise jitter and other "singular" anomalies causing latency deviations.

13. A method for high precision clock recovery over a packet switched network, said method comprising the steps of:

generating packets at a local unit carrying information to a remote unit using a local clock signal, wherein each generated packet carries transmission time information;

generating a remote timestamp at said remote unit for each said generated packet;

providing a minimum network delay estimation for filtering out network jitter, wherein said minimum network delay estimation is defined as a time delay in which a packet remains in the packet switched network, assuming that all transmission queues through which said packet passes are empty, wherein said time delay varies in accordance with network latency, providing a threshold associated with a change in said network latency, said threshold being adjustable in accordance with network conditions; and reconstructing a received clock signal having the same frequency as the local clock signal based on a time difference between said transmission time information and said remote timestamp, wherein said reconstructing step is performed in accordance with said minimum network delay estimation based on said adjustable threshold, the method further comprising the step of:

estimating a noise threshold for determining whether each of the detected minimum delay values is noise or not, wherein said noise threshold estimation comprises the steps of:

obtaining a minimum delay value over a time window;

checking if said obtained minimum delay value is noisy, and if so, multiplying said noise threshold by a parameter, x, wherein x is greater than 1, while if not noisy, dividing said noise threshold by said parameter, y, and determining the value of y by the following equation:

$$y^{100-m} = x^m \Rightarrow y = x^{\frac{m}{100-m}}$$

wherein m is a desired ratio of noisy vs. not noisy (smooth) minimum delay values.

14. A system for high precision clock recovery over a packet switched network, said system comprising:

means for generating packets at a local unit carrying information to a remote unit using a local clock signal, wherein each generated packet carries transmission time information;

means for generating a remote timestamp at said remote unit for each said generated packet;

means for obtaining minimum network delay estimation for filtering out network jitter, wherein said minimum network delay estimation is defined as a time delay in which a packet remains in the packet switched network, assuming that all transmission queues through which said packet passes are empty wherein said time delay varies in accordance with network latency, means for providing a threshold associated with a change in said network latency, said threshold being adjustable in accordance with network conditions; and means for reconstructing a received clock signal having the same frequency as the local clock signal based on a time difference between said transmission time information and said remote timestamp, wherein said reconstruction is performed in accordance with said minimum network delay estimation based on said adjustable threshold, the system further comprising:

means for estimating a noise threshold for determining whether detected minimum delay values are noise or not, wherein said means for estimating said noise threshold operates in accordance with the steps of:

obtaining a minimum delay value over a time window;

checking if the obtained minimum delay value is noisy, and it so, increasing said noise threshold, while if not noisy, decreasing said noise threshold;

wherein increasing said noise threshold is carried out by multiplying said noise threshold by a "Noise Compensation Factor"; and decreasing said noise threshold is carried out by dividing said noise threshold by a "Smooth Compensation Factor".

15. The system of claim 14 wherein said transmission time information comprises a transmitted timestamp.

16. The system of claim 14 wherein said packets are generated at a constant packet rate, and said transmission time information comprises a transmitted timestamp associated with said constant packet rate, wherein said transmitted timestamp is determined at said remote unit.

17. The system of claim 14 further comprising at least one high frequency reference clock.

18. The system of claim 14 further comprising means for estimating a latency change threshold for detecting minimum delay values, wherein each of said minimum delay values is said time difference between said transmitted timestamp and said remote timestamp over a time window.

19. The system of claim 18 further comprising means for converting each of said minimum delay values into a control word for obtaining an accurate received clock signal.

20. The system of claim 18, wherein said latency change threshold directly depends on said noise threshold, and said latency change threshold increases when the noise threshold increases, while said latency change threshold decreases when the noise threshold decreases.

21. The system of claim 14, wherein said "Noise Compensation Factor" is increased if n % or more of the minimum delay values in a timeframe are noisy.

22. The system of claim 14, wherein said "Noise Compensation Factor" is reset to its original value if less than n % of the minimum delay values in a timeframe are noisy.

23. The system of claim 14, wherein said "Smooth Compensation Factor" is increased if k % or more of the minimum delay values in a timeframe are smooth.

24. The system of claim 14, wherein said "Smooth Compensation Factor" is reset to its original value if less than k % of the minimum delay values in a timeframe are smooth.

25. The system of claim 14, wherein said means for obtaining said minimum network delay estimation includes noise jitter and other "singular" anomalies causing latency deviations.

26. A system for high precision clock recovery over a packet switched network, said system comprising:

means for generating packets at a local unit carrying information to a remote unit using a local clock signal, wherein each generated packet carries transmission time information;

means for generating a remote timestamp at said remote unit for each said generated packet;

means for obtaining minimum network delay estimation for filtering out network jitter, wherein said minimum network delay estimation is defined as a time delay in which a packet remains in the packet switched network, assuming that all transmission queues through which said packet passes are empty wherein said time delay varies in accordance with network latency, means for providing a threshold associated with a change in said network latency, said threshold being adjustable in accordance with network conditions; and means for reconstructing a received clock signal having the same frequency as the local clock signal based on a time difference between said transmission time information and said remote timestamp, wherein said reconstruction is performed in accordance with said minimum network delay estimation based on said adjustable threshold, the system further comprising:

means for estimating a noise threshold for determining whether detected minimum delay values are noise or not, wherein said means for estimating said noise threshold operates in accordance with the steps of:

obtaining a minimum delay value over a time window;

checking if the obtained minimum delay value is noisy, and if so, multiplying said noise threshold by a parameter, x, wherein x is greater than 1, while if not noisy, dividing said noise threshold by said parameter, y, and determining the value of y by the following equation:

$$y^{100-m} = x^m \Rightarrow y = x^{\frac{m}{100-m}}$$

wherein m is a desired ratio of noisy vs. not noisy (smooth) minimum delay values.

* * * * *